United States Patent
Zhang et al.

(10) Patent No.: US 7,911,378 B2
(45) Date of Patent: Mar. 22, 2011

(54) SYSTEM AND METHOD FOR APPLYING CODE CORRECTIONS FOR GNSS POSITIONING

(75) Inventors: Yufeng Zhang, Calgary (CA); Yang Gao, Calgary (CA); Suen Lee, Calgary (CA)

(73) Assignee: Nexteq Navigation Corporation, Calgary, Alberta (CA)

( * ) Notice: Subject to any disclaimer, the term of this patent is extended or adjusted under 35 U.S.C. 154(b) by 221 days.

(21) Appl. No.: 12/340,119

(22) Filed: Dec. 19, 2008

(65) Prior Publication Data

US 2010/0156709 A1    Jun. 24, 2010

(51) Int. Cl.
G01S 19/43 (2010.01)
G01S 19/30 (2010.01)

(52) U.S. Cl. .............. 342/357.26; 342/357.69

(58) Field of Classification Search ......... 342/357.26–357.28, 357.68, 357.69, 342/357.23; 701/207, 213
See application file for complete search history.

(56) References Cited

U.S. PATENT DOCUMENTS 6,469,663 B1 * 10/2002 Whitehead et al. ...... 342/357.31
2009/0135057 A1 * 5/2009 Vollath et al. ............ 342/357.03

OTHER PUBLICATIONS

Kouba, J. et al.; Precise Point Positioning Using IGS Orbit and Clock Products; GPS Solutions; 2001; pp. 12-28; vol. 5, No. 2, 2001.
Rho, H. et al.; Dual-Frequency GPS Precise Point Positioning with WADGPS Corrections; Sep. 13-16, 2005; ION GNSS2005; Long Beach Convention Centre, Long Beach, California.
Chen, K. et al.; Real-Time Precise Point Positioning Using Single Frequency Data; Sep. 13-16, 2005; Long Beach Convention Centre, Long Beach, California.
Leandro, R.F. et al.; Wide Area Based Precise Point Positioning; Sep. 26-29, 2006; ION GNSS2006; Fort Worth Convention Centre, Fort Worth, Texas.
Dixon, K.; StarFire TM: A Global SBAS for Sub-Decimeter Precise Point Positioning; Sep. 26-29, 2006; ION GNSS2006; Fort Worth Convention Centre, Fort Worth, Texas.
Gao, Y. et al.; Current State of Precise Point Positioning and Future Prospects and Limitations; Jul. 2-13, 2007; IUGG Assembly; Perugia, Italy.
Rho, H. et al.; The Usefulness of WADGP's Satellite Orbit and Clock Corrections for Dual-Frequency Precise Point Positioning; Sep. 25-28, 2007; ION GNSS2007; Fort Worth Convention Centre, Fort Worth, Texas.
Somieski, A. et al.; Precise Point Positioning with Single-Frequency Mass Market Receivers; Sep. 16-19, 2008; ION GNSS2008; Savannah, Georgia.
Zhang, Y. et al.; Achieving 30cm Autonomous Positioning Accuracy with Nexteq Single-Frequency GPS Receivers; Sep. 16-19, 2008; ION GNSS; Savannah, Georgia.

* cited by examiner

*Primary Examiner* — Dao L Phan
(74) *Attorney, Agent, or Firm* — Bennett Jones LLP

(57) ABSTRACT

A method and system for approximating a position using a Global Navigational Satellite System (GNSS) having a plurality of GNSS satellites and an augmentation system, the method including the steps of obtaining an initial code pseudorange measurement and an initial carrier phase measurement from a signal transmitted by a GNSS satellite in the GNSS system, receiving a code correction from the augmentation system, using the code correction to correct the initial code pseudorange measurement and the initial carrier phase measurement to mitigate for errors in the signal, to result in a corrected code pseudorange measurement and a corrected carrier phase measurement, and using a code dominated measurement in a filter which outputs apposition and ambiguity estimate.

15 Claims, 5 Drawing Sheets

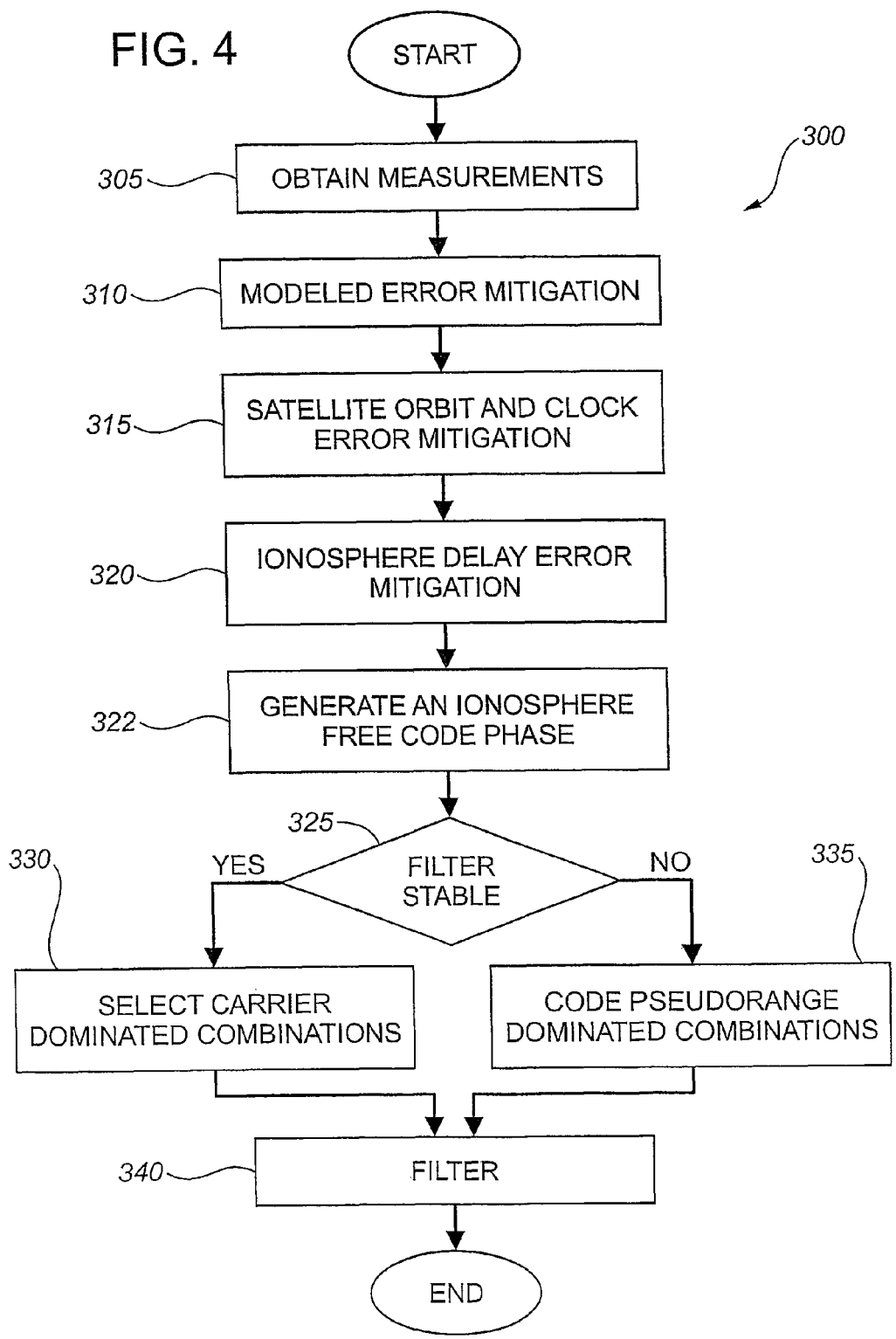

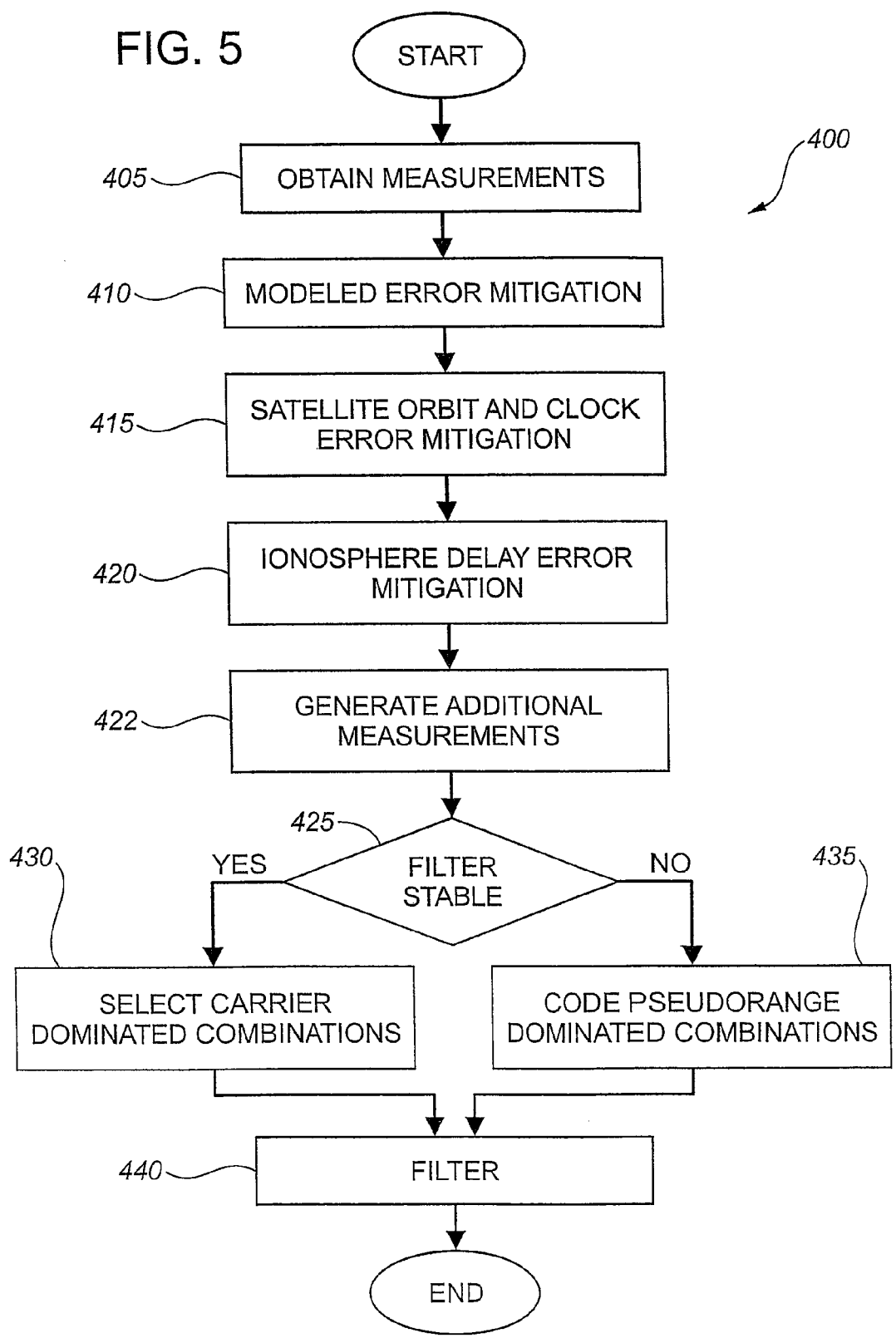

SYSTEM AND METHOD FOR APPLYING CODE CORRECTIONS FOR GNSS POSITIONING

FIELD OF THE INVENTION

The present invention relates to positioning using a Global Navigation Satellite System and more particularly to correcting errors in received signals from satellites in a Global Navigation Satellite System to more accurately determine a position.

BACKGROUND

Global Navigation Satellite Systems (GNSS) is the commonly accepted term for all weather navigation and positioning systems using line of sight radio from orbiting satellites. The Global Positioning System (GPS), which is funded and controlled by the U.S. Department of Defence, is likely the most well known type of GNSS, however, GLONASS which is founded and controlled by Russia, as well as, Europe's GALILEO and China's Beidou, which are currently under development, are also examples of GNSS.

The concept of GNSS positioning is based on the simultaneously ranging to a minimum of four GNSS satellites from a receiver. With known satellite coordinates, the four dimensional coordinates of the receiver position, which include three spatial coordinates and a receiver clock offset, can be determined.

The receiver can approximate a distance to each satellite the receiver is receiving a signal from. The received signals indicates the position of the satellite transmitting the signal and by approximating the time that was required for the transmitted signal to travel from the satellite to the receiver antenna, a distance to the satellite can be approximated.

For a typical GNSS system, the signals transmitted by the satellites allow two types of measurements to be made. A first portion of the signal, the code portion, allows a code pseudorange measurement to be determined and another portion of the signal, the carrier portion, allows a carrier phase measurement to be determined. For example, in GPS systems each transmitted signal has a code portion (C/A code or P code) and a carrier portion.

To approximate a distance to a satellite using the code portion of the signal to determine a code pseudorange measurement, the code portion of the signal transmitted by the satellite is extracted and compared to an identical signal generated locally on the receiver. The time shift necessary to align the received signal with the internally generated signal is then used to approximate the travel time for the transmitted signal to travel between the satellite and the receiver. By using the travel time and the speed of light, the code pseudorange, which is an approximate of the distance to the satellite, can be determined. The code pseudorange measurement is an unambiguous approximation of distance to the satellite transmitting the signal. However, the code portion of the transmitted signal generally has wavelengths in the tens of meters to hundreds of meters in length, so this approximation of the distance to the satellite, by itself yields relatively poor position accuracy.

The second type of measurement, a carrier phase measurement, can be used to obtain a more accurate distance to the satellite transmitting the signals. The carrier portion of the transmitted signal can be extracted and used to obtain the carrier phase measurement. The carrier phase measurement is the phase difference between the carrier portion of the received satellite signal and a receiver-generated carrier portion of the signal. The carrier portion of the signal generally has wavelengths in the tens of centimeters, which can allow better position accuracy than the code portion of the signal with its longer wavelengths. However, the carrier portion of the signal consists of a repeated waveform and one carrier wave cannot be distinguished from another by the receiver. Initially, the receiver can only determine how far out of phase the received carrier portion of the signal is from the internally generated carrier portion of the signal and therefore can only determine a distance to the satellite transmitting the signal that consists of a distance that is less than a wavelength of the carrier portion of the signal plus an unknown amount of carrier waveforms. This is referred to as ambiguity or integer ambiguity because there is unknown number (integer) of carrier wavelengths plus the determined fractional distance to the satellite transmitting the signal. However, because of the small wavelength of the carrier portion of the signal relative to the wavelengths of the code portion of the signal, the receiver can determine the difference in phase shift between the received carrier portion of the signal and the internally generated carrier signal to a small fraction of the wavelength of the carrier signal, making it potentially much more accurate than using the code portion of the signal to determine differences.

However, even using the carrier portion of the signal to determine differences is not completely accurate because the signals being transmitted between the satellites and the receiver are subjected to numerous errors, such as satellite orbit, satellite clock error, atmosphere delay, environmental affections and the like. Augmentation systems have been developed to mitigate these errors. These systems determine errors and provide corrections for correcting code pseudorange measurements and carrier phase measurements determined by a receiver. These augmentation systems typically use one or more receivers located at precisely known coordinates to observe errors in received signals from the satellites in a GNSS system and calculate corrections for these observed errors. The augmentation systems can be ground based or satellite based and some freely provide the corrections whereas others require a subscription and the payment of subscription fees in order to receive and use the corrections. These augmentation systems include freely available augmentation systems such as the Wide Area Augmentation System (WAAS) covering North America, the European Geostationary Navigation Overlay System (EGNOS) covering Europe and the Multifunctional Transport Satellite Space bases Augmentation System (MSAS) covering East Asia, and privately owned systems, such as OmniStar™ and StarFire™. Typically, the publicly available augmentation systems provide the corrections for free, but only provide code corrections. The privately owned augmentation systems, typically provide carrier phase corrections, as well, but usually require the user to have a subscription to receive and use the corrections.

The code corrections received from the publicly available augmentation systems are applied to the code pseudoranges determined by a receiver and the corrected code pseudorange is then smoothed using the carrier phase. However, carrier phase smoothing fundamentally remains a code pseudorange based positioning method where the code pseudorange is the dominant measurement.

SUMMARY OF THE INVENTION

In one aspect, the invention may comprise a method for approximating a position using a GNSS system having a plurality of GNSS satellites and an augmentation system, the method comprising:

(a) obtaining an initial code pseudorange measurement and an initial carrier phase measurement from a signal transmitted by a GNSS satellite in the GNSS system;
(b) receiving at least one code correction from the augmentation system;
(c) using the at least one code correction to correct the initial code pseudorange measurement and the initial carrier phase measurement to mitigate for errors in the signal, to result in a corrected code pseudorange measurement and a corrected carrier phase measurement; and
(d) using a code dominated measurement in a filter which outputs a position and ambiguity estimate.

In one embodiment, a carrier phase dominated measurement is used in the filter. In another embodiment, the method further comprises step (e) of using a carrier phase dominated measurement in the filter after a stable filter output is achieved by repeating steps (a) to (d). In one embodiment, if no corrections are received from the augmentation system, the method directly goes from step (a) to step (c) and the code corrections are handled as zeros.

In another aspect, the invention comprises a computer readable memory having recorded thereon statements and instructions for execution by a data processing system to carry out a method as described or claimed herein.

In another aspect, the invention comprises a device for approximating a position using a GNSS system having a plurality of satellites and an augmentation system, the device comprising:
(a) at least one memory, the memory containing a set of program instructions;
(b) at least one processor operatively connected to the memory, the at least one processor responsive to the program instructions to:
  (i) obtain an initial code pseudorange measurement and an initial carrier phase measurement from a signal transmitted by one of the plurality of satellites in the GNSS system;
  (ii) receive at least one code correction from the augmentation system;
  (iii) use the at least one code correction to correct the initial code pseudorange measurement and the initial carrier phase measurement to mitigate for errors in the signal, resulting in a corrected code pseudorange measurement and a corrected carrier phase measurement; and
  (iv) use a code pseudorange dominated measurement in a filter which outputs a position and ambiguity estimate;
  (v) repeating steps (i) to (iv) until a stable filter output is achieved; and
  (vi) using a carrier phase dominated measurement in the filter.

In alternative embodiments, the program instructions may be to a method as described or claimed herein.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows: Referring to the drawings wherein like reference numerals indicate similar parts throughout the several views, several aspects of the present invention are illustrated by way of example, and not by way of limitation, in detail in the figures, wherein:

FIG. 4 is a flowchart of a method for code correction aided carrier phase based single point GNSS positioning using a single frequency; and FIG. 5 is a flowchart of a method for code correction aided carrier phase based single point GNSS positioning using multiple frequencies.

DETAILED DESCRIPTION OF VARIOUS EMBODIMENTS

The invention relates to a system and method for using code corrections in carrier phase based single point GNSS positioning. When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

Figure 1:
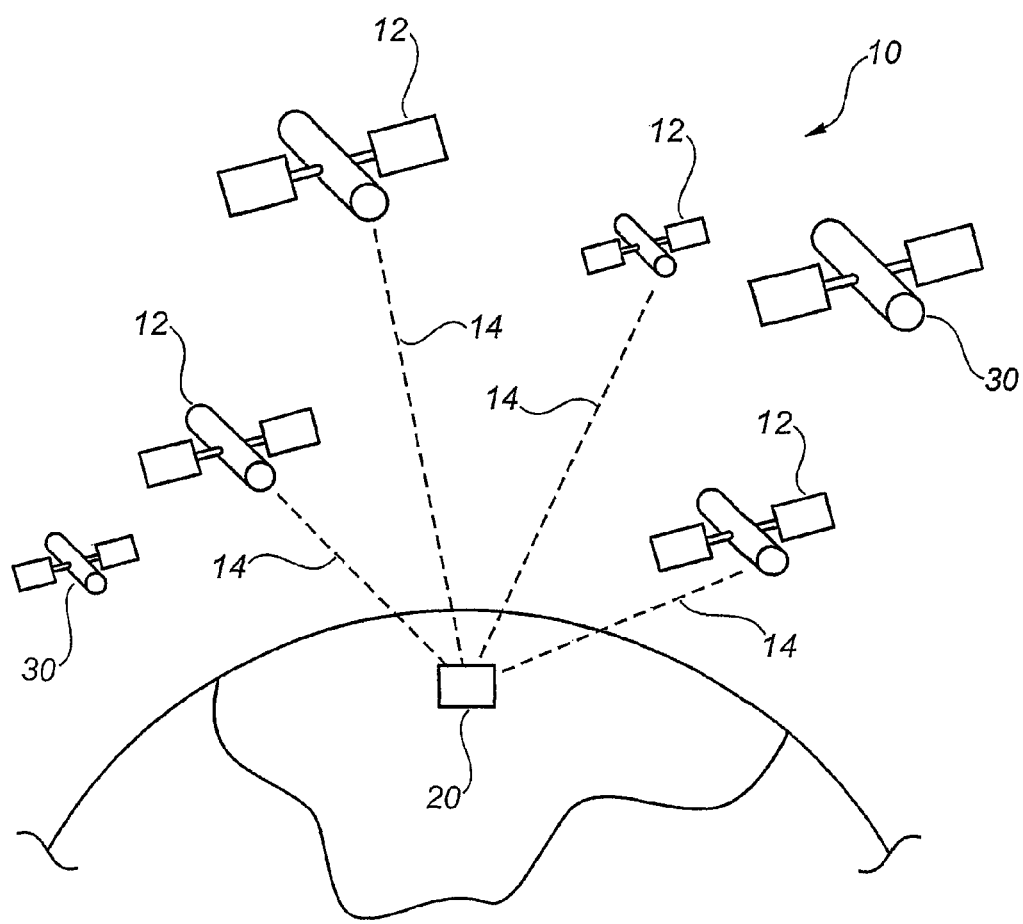
FIG. 1 is a representative illustration of a Global Navigation Satellite System (GNSS) with an augmentation system satellite.

FIG. 1 illustrates a representative view of Global Navigation Satellite system (GNSS) 10. In one embodiment, the GNSS 10 comprises the Global Positioning System (GPS). The GNSS 10 includes a plurality of satellites 12 orbiting the earth with each satellite 12 transmitting signals 14 that include a data stream providing information regarding the satellite 12 transmitting the signal 14. The information provided in the data stream typically includes the position of the satellite 12 broadcasting the signal 14 along with the time the signal 14 is transmitted. The satellite clock is a very precise atomic clock.

The GNSS 10 may broadcast the signals 14 on multiple frequencies. For example, if the GNSS 10 is a GPS system, each satellite 12 can broadcast the signals 14 using more than one frequency (i.e. the L1 and L2 frequencies used by satellites in the GPS network).

A GNSS receiver 20 is provided that is operative to receive the signals 14 transmitted by the plurality of satellites 12. Typically, the GNSS receiver 20 must be in line of sight with a satellite 12 to receive the signals 14 transmitted by that satellite 12. The GNSS receiver 20 can use the signals 14 received from the satellites 12 to determine code pseudorange and carrier phase measurements. The present invention may be implemented with and/or incorporated into any GNSS or GPS device, including portable, handheld GPS navigation units, GPS-enabled wireless telephones, GPS-enabled personal digital assistants, GPS-enabled laptop computers, avionics equipment that incorporates GPS receivers, marine equipment that incorporates GPS receivers, and the like. Any such device shall be considered a GNSS receiver herein.

It is noted that the clock in a GNSS receiver is not an atomic clock, and as such does not keep the time as precisely as the satellite clocks. Therefore, each distance measurement is corrected to account for the clock error in the GNSS receiver. This distance or range correction attributable to the clock error is termed a pseudorange. The code pseudorange measurement is the distance between one of the satellites 12 that transmitted the signal 14 and the antennas of the GNSS receiver 20. By determining the time shift needed to align a code portion of the signal 14 received from one of the satellites 12 with a code portion of the signal generated by the GNSS receiver 20, a code pseudorange measurement can be determined. Using the determined time shift and the speed of light, an unambiguous approximation of the distance between the satellite 12 transmitting the signal 14 and the GNSS receiver 20 can be determined.

The carrier phase measurement uses the phase difference between a carrier portion of a received signal 14 and an identical receiver-generated carrier signal to determine and even more accurately approximate the distance between the satellite 12 transmitting the signal 14 and the GNSS receiver 20.

The GNSS receiver 20 can determine its position by triangulation using the transmitted signals 14 of a number of the satellites 12 (typically 4 or more) to determine approximate distances between the GNSS receiver 20 and the various satellites 12 using both code pseudorange measurements and carrier phase measurements.

Along with the plurality of satellites 12 and the GNSS receiver 20, an augmentation system 30 is also provided. The augmentation system 30 is operative to transmit code correction data to the GNSS receiver 20. The augmentation system 30 can be a ground based augmentation system or a Satellite Based Augmentation System (SBAS) such as the Wide Area Augmentation System (WAAS) in use in the United States, Multi functional Satellite Augmentation System (MSAS) Japan, European Geostationary Navigation Overlay Service (EGNOS) in Europe and other SBAS systems. The augmentation system 30 is operative to transmit code corrections to the GNSS receiver 20 to be applied to the code pseudorange and carrier phase measurements to generate corrected pseudorange measurements and corrected carrier phase measurements.

In the case of WAAS, a network of wide area ground reference stations (WRSs) are linked to cover a service area including the entire U.S. and some areas of Canada and Mexico. The number of WRSs is currently about thirty-eight. The WRSs are precisely surveyed so that the exact location of each WRS is known. Signals from GPS satellites are received and analyzed by the WRSs to determine errors in the signals, including errors caused by the ionospheric disturbances described above. Each WRS in the network relays its data to a wide area master station (WMS) where correction information is computed. The WMS calculates correction messages for each GPS satellite based on correction algorithms and assesses the overall integrity of the system. The correction messages are then uplinked to a pair of Geostationary Communication Satellites (GEOs) via a ground uplink system. The GEOs broadcast the messages on the same frequency as GPS (L1, 1575.42 MHz) to GPS receivers within the coverage area of the WAAS satellites. The GEOs are also referred to by those skilled in the art as SBAS or WAAS satellites.

The code corrections can include several types of error corrections, including fast corrections, slow corrections and ionospheric corrections. The fast corrections are used to correct for rapidly changing errors such as the fast-varying component of the clock errors in the clocks of the satellites 12. The slow corrections are used to correct the slow-varying orbit errors as well as the slow-varying component of the clock errors in the clocks of the satellites 12.

The code correction is received in a message from a SBAS satellite, or a GBAS station. Data included in code correction messages includes mask data and correction data.

One type of information that is included in the correction messages is ionospheric correction data. Ionospheric corrections are broadcast for selected ionospheric grid points generally spaced at 5 degree intervals in both latitude and longitude directions. GNSS receivers use the code correction to correct for GPS satellite signal errors caused by ionospheric disturbances and other inaccuracies.

In one embodiment, the invention comprises a method for approximating a position using a GNSS system having a plurality of GNSS satellites and an augmentation system, the method comprising:

(a) obtaining an initial code pseudorange measurement and an initial carrier phase measurement from a signal transmitted by a GNSS satellite;

(b) receiving at least one code correction from the augmentation system;

(c) using the at least one code correction to correct the initial code pseudorange measurement and the initial carrier phase measurement to mitigate for errors in the signal, to result in a corrected code pseudorange measurement and a corrected carrier phase measurement; and (d) using a code pseudorange dominated measurement in a filter which outputs a position and ambiguity estimate;

In one embodiment in step (d), a carrier phase dominated measurement is used in the filter which outputs a position and ambiguity estimate.

In one embodiment, a further step (e) is applied using a carrier phase dominated measurement in the filter after a stable filter output is achieved by repeating (a) to (d).

In one embodiment, if no corrections are received from the augmentation system, the method directly goes from step (a) to step (c) and the code corrections are handled as zeros.

Figure 2:
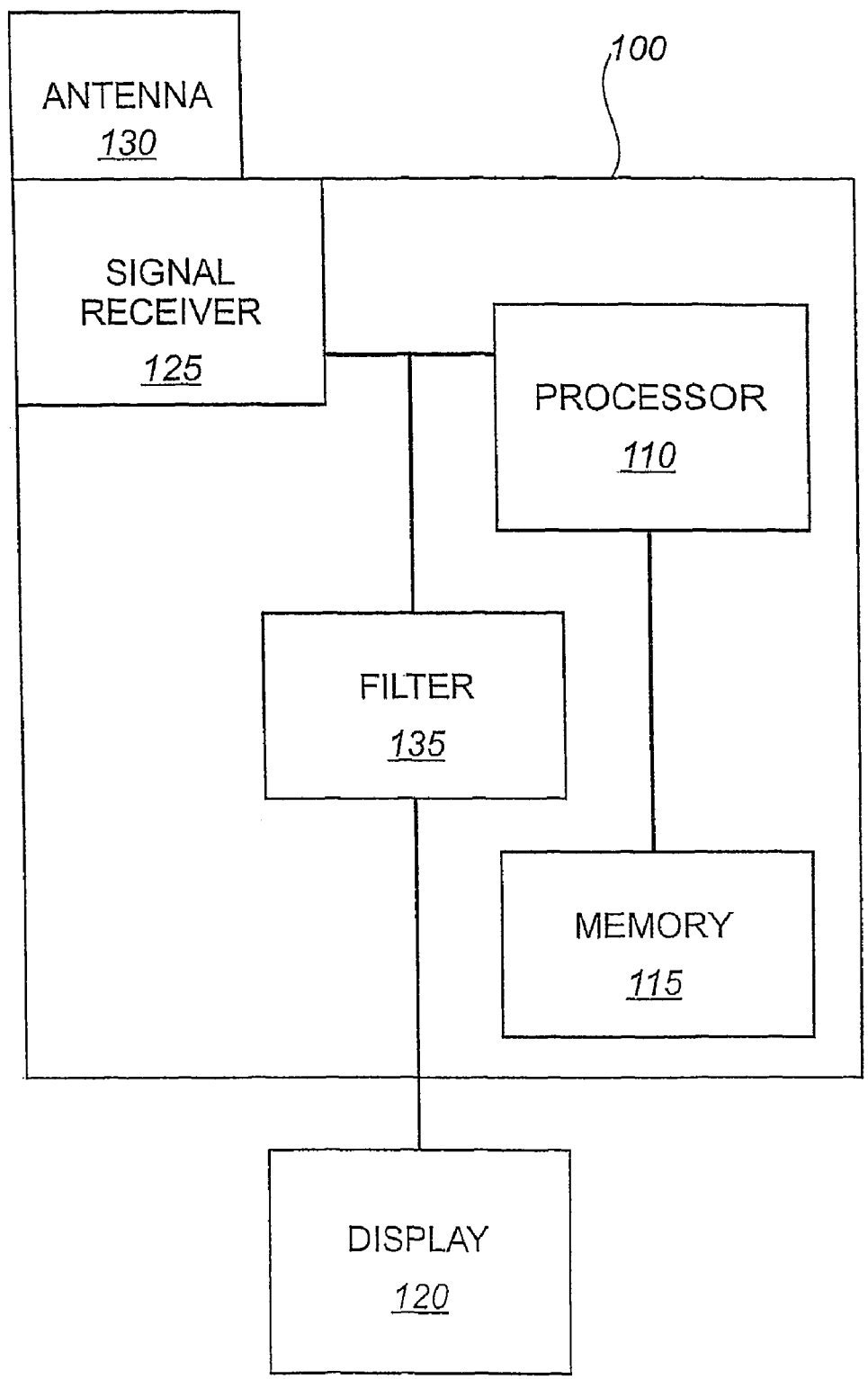
FIG. 2 is a schematic illustration of a suitable receiver device for implementing the present invention.

FIG. 2 is a schematic illustration of one embodiment of a suitable receiver device 100 that can be used as the GNSS receiver 20 shown in FIG. 1. The receiver device 100 can include a processor 110, a memory 115, a display 120, a signal receiver 125, an antenna 130 and a filter 135.

The processor 110 is a data processor as known in the art capable of implementing computer readable instructions. The memory 115 may be computer storage media including volatile and non-volatile, removable and non-removable media for storage of computer-readable data and programs instructions that the processor 110 can use to control the operation of the receiver device 100 and implement the methods described herein. The signal receiver 125 is operative to receive the signals 14 transmitted by the satellites 12 through the antenna 130, as well as to separate or demodulate the received signals into the different portions (i.e. the code portion and the carrier portion).

A filter 135 may be implemented in hardware or software and comprises a filter for determining a precise position and for estimating carrier phase ambiguities. In one embodiment, the filter comprises a recursive estimator such as a Kalman filter.

In one embodiment, a display 120 is provided to display data such as the position of the receiver 100 as determined by the processor 110 and output by the filter 135.

Figure 3:
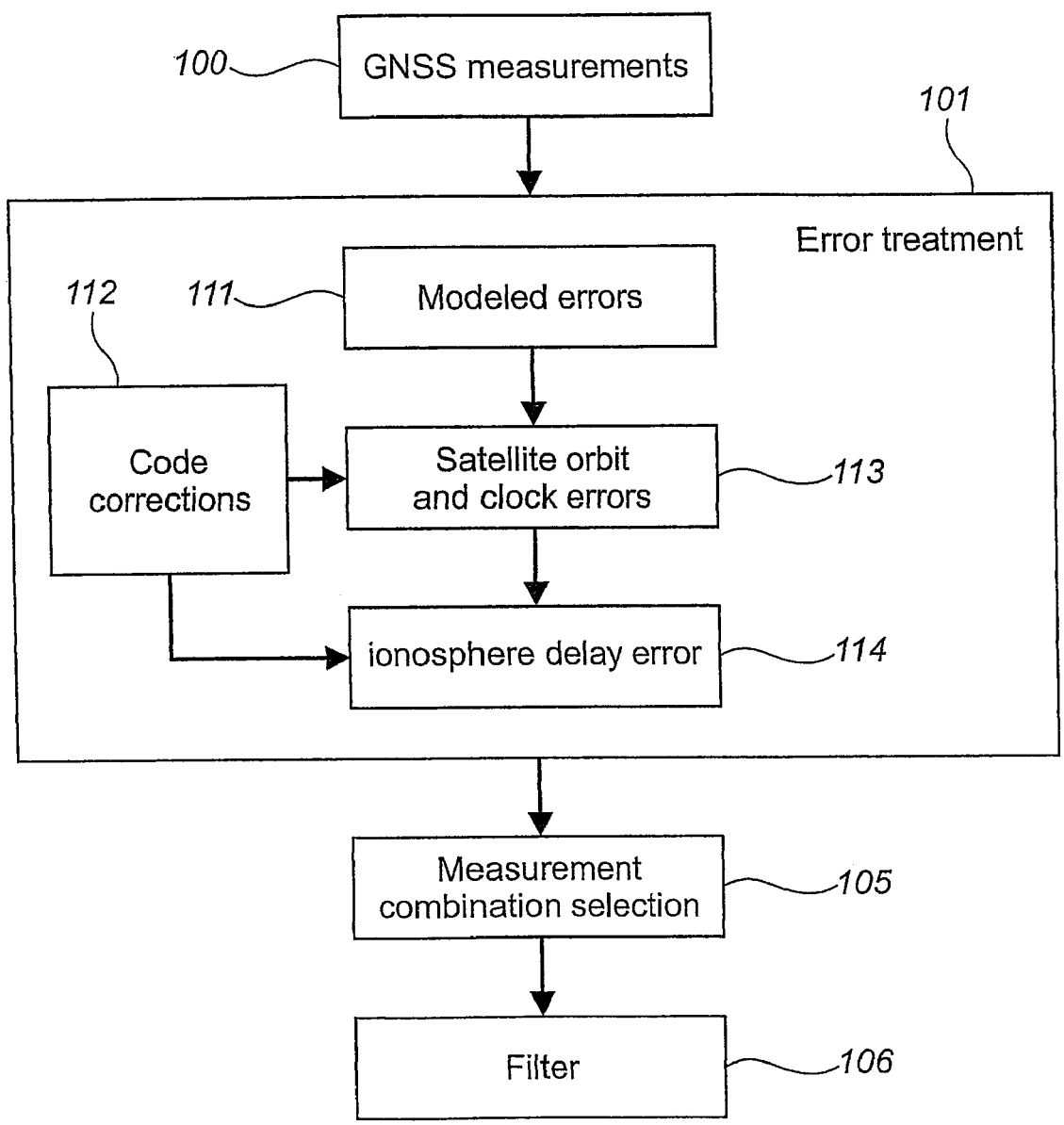
FIG. 3 is a schematic flowchart showing a basic method of implementing the present invention.

FIG. 3 shows a basic flowchart of one embodiment of the present invention. The GNSS measurements from the satellite signal 14 are received at step 200 and submitted to an error treatment module 201. The measurements are corrected for modeled errors at step 211, for satellite orbit and clock errors at step 213 and for ionosphere delay error at step 214. The latter two corrections are made using code corrections 212 received from an augmentation system, such as a WAAS satellite 30. A corrected measurement or a combination of corrected measurements is selected at step 205 and are then submitted in step 206 to the filter 135. These steps are repeated on a periodic basis in order to update the receiver position, or to refine the accuracy of the receiver position.

FIG. 4 illustrates a flowchart of a method 300 for code correction aided carrier phase based single point GNSS positioning where a single frequency of the satellite signal 14 is used. At step 305, single frequency initial code pseudorange and carrier phase measurements are obtained by a GNSS receiver 20, such as that illustrated in FIG. 2 or 3. If the GNSS system 10 is the GPS system, the single frequency initial code pseudorange and carrier phase measurements can be obtained using the L1 channel only.

The obtained initial code pseudorange and carrier phase measurements are subjected to error correction at steps 310, 315 and 320 of the method 300 to obtain a corrected pseudorange measurement and a corrected carrier phase measurement. The pseudorange measurement and carrier phase measurement are subjected to modeled error treatment, as well as having code corrections applied to mitigate satellite orbit errors, clock errors and ionosphere delay errors in these steps. The order in which error correction takes place is not essential, and may be varied from that illustrated in FIG. 4.

At step 310, error modeling is used to correct the initial code pseudorange measurement and the initial carrier phase measurements and to attempt to mitigate errors in the received pseudorange and carrier phase measurements. The error modeling can be used address one or more errors common to the transmitted satellite signals, including the Sagnac effect, the relativity effect, troposphere delay, earth tide compensation, and the like. These modeled errors and their corrections are well-known in the art and need not be further described herein. The error modeling can be used to treat both the code pseudorange measurement and the carrier phase measurement. The error modeling can also be used to attempt mitigate phase windup for the carrier phase measurements.

After the code pseudorange and carrier phase measurements have been treated using error modeling at step 310, the treated pseudorange and carrier phase measurements are further treated at step 315 by applying satellite orbit and clock error corrections. Step 315 uses code corrections received from the augmentation system 30 shown in FIG. 1, which are applied to the code pseudorange and phase carrier measurements to address errors occurring from satellite orbit and clock error corrections. For step 310, the code corrections can include corrections to the orbital coordinates of the satellite that transmitted the signal and a time offset to correct for errors in the clock time transmitted by the satellite observed by the augmentation system 30. These code corrections are applied to both the code pseudorange measurements and the carrier phase measurements and to measurement combinations that include both code pseudorange and carrier phase measurements.

After the code pseudorange and phase carrier measurements have had the code corrections applied to address the satellite orbit and clock errors at step 315, the code pseudorange and phase carrier measurements are treated for errors that occur from delays in the transmitted signal passing through the ionosphere at step 320. Code corrections in the form of ionosphere delay code corrections, received from the augmentation system 30 are applied to the code pseudorange and carrier phase measurements to form a corrected code pseudorange measurement and a corrected carrier phase measurement.

Typically, the code corrections for ionospheric delay are provided as a wide-area ionospheric delay model allowing a specific ionospheric delay to be determined based on the position of the GNSS receiver 10. The GNSS receiver 10 receives the code corrections for ionosphere delay as a grid having a set of values indicating observed ionospheric delays where each of the values correspond to a specific position or set of coordinates. An approximation of the position of the GNSS receiver 10 can then be used to determine which of the values should be used. Interpolation often has to be used when the position of the GNSS receiver 10 falls between values in the model. The determined code correction for the position of the GNSS receiver 10 is typically in the form of a measurement of length or distance, time, or some other relevant unit, that is used to correct the code pseudorange measurement, and the carrier phase measurement. The code correction is then applied to both the code pseudorange measurement and the carrier phase measurement to form the corrected code pseudorange measurement and the corrected carrier phase measurement.

At step 322, the corrected code pseudorange measurement and the corrected carrier phase measurement are used to generate an ionosphere free code phase measurement (IFCP) as follows:

$$IFCP = \frac{P + \phi}{2} \quad (1)$$

where P is the corrected code pseudorange measurement and $\phi$ is the corrected carrier phase measurement.

In one embodiment, at step 325 the method 300 checks to determine whether the filter 135 is stable. The filter 135 is used to determine a precise position as well as to estimate the carrier phase ambiguity. For the purpose of this invention, the filter will be considered stable if a position has been determined with the accuracy of the ambiguity resolved to below a predetermined level. If the ambiguity accuracy of the filter exceeds this level, then the filter will be considered unstable. If the filter 135 has not become stable yet at step 325, the method 300 moves on to step 330 and supplies the filter with a code pseudorange dominated measurement. A measurement which is dominated by the code pseudorange is one where the code pseudorange is the primary determinant of position within the filter 135. The code pseudorange may be combined with one or more secondary measurements. A code pseudorange dominated measurement may comprise:

(a) a code pseudorange measurement plus a carrier phase measurement combination;
(b) a code pseudorange measurement plus IFCP combination; or
(c) a code pseudorange measurement, a carrier phase measurement plus IFCP combination.

One skilled in the art will appreciate that each of these code pseudorange dominated measurement has a secondary measurement which includes a corrected carrier phase measurement. As a result, the accuracy of the receiver may be enhanced.

Once the filter 135 has used a code pseudorange dominated measurement or has become stable, the method 300 moves on to step 330 and selects a carrier phase dominated measurement to pass to the filter 135. A measurement which is dominated by the carrier phase is one where the carrier phase measurement is the primary determinant of position within the filter 135. The carrier phase measurement may be used directly or combined with one or more secondary measurements. The carrier phase dominated measurement combinations may include:

(a) the carrier phase measurement only;
(b) the IFCP only;
(c) the carrier phase measurement plus IFCP combination.

The selected measurements are then filtered at step 340 to determine a position of the GNSS receiver 10 and to determine an estimate for the carrier phase ambiguities.

FIG. 5 illustrates a method for code correction aided carrier phase based single point GNSS positioning from multiple frequencies. This could be used where the GNSS is a GPS system and the satellites 12 are broadcasting signals 14 on both the L1 frequency and L2 frequency.

At step 405, initial code pseudorange and carrier phase measurements are obtained using multiple frequencies of a transmitted signal 14 from a satellite 12 in the GNSS system 10.

The method 400 subjects the initial code pseudorange and carrier phase measurements to error corrections at steps 410, 415 and 420. These error corrections steps may be performed in any order, and the order shown in FIG. 5 is one example only.

At step 410 error modeling is used to error correct the initial pseudorange and carrier phase measurements to attempt to mitigate errors in the pseudorange and carrier phase measurements. The error modeling is performed in like manner as step 310 previously described.

After the code pseudorange and carrier phase measurements have been error corrected using error modeling at step 410, the treated code pseudorange and carrier phase measurements are subjected to further error correction to mitigate errors at step 415 by applying satellite orbit and clock error corrections, in like manner to step 315, described above. The code corrections can include corrections to the orbital coordinates of the satellite that transmitted the signal and a time offset to correct for errors in the clock time transmitted by the satellite observed by the augmentation system 30. The code corrections are applied to both the code pseudorange measurements and the carrier phase measurements.

After the code pseudorange and phase carrier measurements have had the code correction applied to address satellite orbit errors and clock errors at step 415, code corrections to address ionosphere delay are applied to both the code pseudorange measurement and carrier phase measurement at step 420. Corrections in the form of ionosphere delay code corrections, received from the augmentation system 30 shown in FIG. 1 are applied to the code pseudorange and carrier phase measurements to form a corrected code pseudorange measurement and a corrected carrier phase measurement.

The ionosphere delay code corrections employ a slightly different strategy where multiple frequencies are employed, as compared to the single frequency scenario described above.

Once the multi-frequency code pseudorange measurements and carrier phase measurement have been corrected at step 420, an IFCP may be calculated at step 422 using formula (I) above, along with an ionosphere free code pseudorange measurement ($P_{IonosphereFree}$) and a ionosphere free carrier phase measurement ($\phi_{IonosphereFree}$) as follows:

$$P_{IonosphereFree} = \frac{f_2 P_1 - f_2 P_1}{f_2 - f_1} \quad (2)$$

where $P_1$ is the corrected code pseudorange measurement of the first signal (e.g. L1 if the GNSS is GPS) and $P_2$ is the corrected code pseudorange measure of the second signal (i.e. L2 if the GNSS is GPS), $f_1$ is the frequency of the carrier signal in the first signal and $f_2$ is the frequency of the carrier signal in the second signal;

$$\phi_{IonosphereFree} = \frac{f_2 \phi_1 - f_1 \phi_2}{f_2 - f_1} \quad (3)$$

where $\phi_1$ is the corrected carrier phase measurement of the first signal and $\phi_2$ is the corrected carrier phase measurement of the second signal.

In one embodiment, at step 425 the method 400 checks to determine whether the filter 135 is stable or not. If the filter has not become stable yet at step 425, the method 400 moves on to step 435 and selects a code pseudorange dominated measurement to pass to the filter. In a multifrequency scenario, the code pseudorange dominated measurements combinations can include:

(a) a code pseudorange measurement plus $\phi_{IonosphereFree}$ combination;

(b) a code pseudorange measurement, $P_{IonosphereFree}$, plus $\phi_{IonosphereFree}$;

(c) a code pseudorange measurement, $P_{IonosphereFree}$, $\phi_{IonosphereFree}$ plus IFCP combination;

or (d) a code pseudorange measurement, $\phi_{IonosphereFree}$ plus IFCP combination.

However, if at step 425, the filter 135 is or has become stable, the method 400 moves on to step 430 and selects a carrier phase dominated measurement to be passed to the filter 135. The carrier phase dominated measurement may include combinations such as:

(a) $\phi_{IonosphereFree}$ plus the $P_{IonosphereFree}$ measurement;

(b) the $\phi_{IonosphereFree}$ measurement only;

(c) $\phi_{IonosphereFree}$, $P_{IonosphereFree}$, plus IFCP; and (d) $\phi_{IonosphereFree}$ plus IFCP.

The selected measurements are then filtered at step 440 to determine the position of the GNSS receiver 10 and to determine an estimate for the carrier phase ambiguities.

The present invention may also be described in the context of computer-executable instructions, such as program modules, being executed by a computer. Generally, program modules include routines, programs, objects, components, data structures, etc. that perform particular tasks or implement particular abstract data types.

The present invention can be realized in hardware, software, or a combination of hardware and software. The present invention can be realized in a centralized fashion in one data processing system such as a computer system, or in a distributed fashion where different elements are spread across several interconnected data processing systems. A typical combination of hardware and software could be a general purpose computer system or other data processing system with a computer program that, when being loaded and executed, controls the computer system such that it carries out the methods described herein.

Program instructions includes any expression, in any language, code or notation, of a set of instructions intended to cause a data processing system having an information processing capability to perform a particular function either directly or after conversion to another language, code or notation, and/or reproduction in a different material form.

The invention also includes an article of manufacture which comprises a computer readable memory having computer readable statements and instructions contained thereon for implementing one or more of the methods described above, using a data processing system.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed is:

1. A method for approximating a position using a GNSS system having a plurality of GNSS satellites and an augmentation system, the method comprising:
   (a) obtaining an initial code pseudorange measurement and an initial carrier phase measurement from a signal transmitted by a GNSS satellite in the GNSS system;
   (b) receiving at least one code correction from the augmentation system;
   (c) using the at least one code correction to correct the initial code pseudorange measurement and the initial carrier phase measurement to mitigate for errors in the signal, to result in a corrected code pseudorange measurement and a corrected carrier phase measurement;
   (d) using a code pseudorange dominated measurement in a filter which outputs a position and ambiguity estimate; and
   (e) repeating steps (a) to (d) until a stable filter output is achieved; and
   (f) thereafter using a carrier phase dominated measurement in the filter;
   (g) or proceeding from step (c) to step (f) if the filter output is stable after step (c).

2. The method of claim 1 wherein if no corrections are received from the augmentation system, the method directly goes from step (a) to step (c) where the code corrections are treated as zeros.

3. The method of claim 1 wherein the code pseudorange dominated measurement comprises a combination of the corrected code pseudorange measurement and one or more of the following measurements: corrected phase measurement, corrected ionosphere free phase measurement, corrected ionosphere free code measurement, and corrected ionosphere free code phase measurement.

4. The method of claim 1 wherein the carrier phase dominated measurement comprises of only the corrected carrier phase measurement or a combination of the corrected carrier phase measurement and one or more of the following measurements: corrected phase measurement, corrected ionosphere free phase measurement, corrected ionosphere free code measurement, and corrected ionosphere free code phase measurement.

5. The method of claim 1 using a single frequency GNSS system wherein the code pseudorange dominated measurement comprises one of:
   (a) a code pseudorange measurement plus a carrier phase measurement combination;
   (b) a code pseudorange plus IFCP combination; or
   (c) a code pseudorange, carrier phase plus IFCP combination.

6. The method of claim 5 wherein the carrier phase dominated measurement comprises one of:
   (a) the corrected carrier phase measurement only;
   (b) the IFCP only;
   (c) carrier phase plus IFCP combination.

7. The method of claim 1 using a multiple frequency GNSS system wherein the code pseudorange dominated measurement comprises one of:
   (a) a code pseudorange measurement plus $\phi_{IonosphereFree}$ combination;
   (b) a code pseudorange measurement, $P_{IonosphereFree}$, plus $\phi_{IonosphereFree}$;
   (c) a code pseudorange measurement, $P_{IonosphereFree}$, $\phi_{IonosphereFree}$ plus IFCP combination; or (d) a code pseudorange measurement, $\phi_{IonosphereFree}$ plus IFCP combination.

8. The method of claim 7 wherein the carrier phase dominated measurement comprises one of:
   (a) $P_{IonosphereFree}$ plus the $\phi_{IonosphereFree}$ measurement;
   (b) the $\phi_{IonosphereFree}$ measurement only;
   (c) $P_{IonosphereFree}$, $\phi$IonosphereFree plus IFCP; and
   (d) $\phi_{IonosphereFree}$ plus IFCP.

9. The method of claim 1 wherein the code corrections received from the augmentation system are used to mitigate a satellite orbit error or a clock error, or both a satellite orbit error and a clock error.

10. The method of claim 1 wherein the code corrections received from the augmentation system are used to mitigate ionosphere delay errors.

11. The method of claim 1 wherein the GNSS system is a GPS, GLONASS, GALILEO, Beidou or a future Global Navigation Satellite System.

12. The method of claim 1 wherein the augmentation system is a satellite based augmentation system, or a ground based augmentation system providing code corrections.

13. The method of claim 12 wherein the satellite based augmentation system comprises the US Wide Area Augmentation System, the Japanese Multi functional Satellite Augmentation system, the European Geostationary Navigation Overlay Service or a future augmentation system providing code correction.

14. A device for approximating a position using a GNSS system having a plurality of satellites and an augmentation system, the apparatus comprising:
   (a) at least one memory, the memory containing a set of program instructions;
   (b) at least one processor operatively connected to the memory, the at least one processor responsive to the program instructions to:
      (i) obtain an initial code pseudorange measurement and an initial carrier phase measurement from a signal transmitted by one of the plurality of satellites in the GNSS system;
      (ii) receive at least one code correction from the augmentation system;
      (iii) use the at least one code correction to correct the initial code pseudorange measurement and the initial carrier phase measurement to mitigate for errors in the signal, resulting in a corrected code pseudorange measurement and a corrected carrier phase measurement; and
      (iv) use a code pseudorange dominated measurement in a filter which outputs a position and ambiguity estimate;
      (v) repeating steps (i) to (iv) until a stable filter output is achieved; and (vi) using a carrier phase dominated measurement in the filter.

15. A device for approximating a position using a GNSS system having a plurality of satellites and an augmentation system, the apparatus comprising:
   (a) at least one memory, the memory containing a set of program instructions;
   (b) at least one processor operatively connected to the memory, the at least one processor responsive to the program instructions to implement the method of claim 1.

* * * * *